United States Patent
Fuller et al.

(10) Patent No.: US 7,858,068 B2
(45) Date of Patent: Dec. 28, 2010

(54) METHOD OF STORING AND GENERATING HYDROGEN FOR FUEL CELL APPLICATIONS

(75) Inventors: Ian M. Fuller, Bellbrook, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 479 days.

(21) Appl. No.: 11/787,440

(22) Filed: Apr. 17, 2007

(65) Prior Publication Data

US 2008/0256858 A1  Oct. 23, 2008

(51) Int. Cl.
  *C01B 3/06* (2006.01)
(52) U.S. Cl. .................. 423/648.1; 423/658.2
(58) Field of Classification Search .......... 423/648.1, 423/658.2
  See application file for complete search history.

(56) References Cited

U.S. PATENT DOCUMENTS

| | | | |
|---|---|---|---|
| 5,372,617 A | 12/1994 | Kerrebrock et al. | |
| 5,728,464 A | 3/1998 | Checketts | |
| 5,817,157 A | 10/1998 | Checketts | |
| 6,358,488 B1 | 3/2002 | Suda | |
| 6,534,033 B1 | 3/2003 | Amendola et al. | |
| 6,746,496 B1 | 6/2004 | Kravitz et al. | |
| 6,866,689 B2 | 3/2005 | Lumsden et al. | |
| 6,866,836 B2 | 3/2005 | Jorgensen | |
| 6,932,847 B2 | 8/2005 | Amendola et al. | |
| 7,052,671 B2 | 5/2006 | McClaine et al. | |
| 7,083,657 B2 | 8/2006 | Mohring et al. | |
| 2006/0196112 A1* | 9/2006 | Berry et al. | 44/550 |
| 2006/0292064 A1* | 12/2006 | Wolverton | 423/644 |
| 2007/0104642 A1* | 5/2007 | Vajo et al. | 423/658.2 |

OTHER PUBLICATIONS

Kaufman, et al "Hydrogen Gen. by Hydrolysis of Sodium Tetrahydroborate: Effects of Acids and Tran. Metals and their Salts," J. of Chem. Soc., Dalton Trans. (1985) 307-313.

* cited by examiner

*Primary Examiner*—Wayne Langel

(57) ABSTRACT

A preferred embodiment of the present invention is a hydrogen gas storage and supply method, comprising (a) providing a dry, solid-state hydrogen fuel source comprising a solid metal hydride or chemical hydride and a reaction-controlling agent in a solid state, wherein the hydride and the reaction-controlling agent are mixed at a desired proportion; and (b) delivering a desired amount of a liquid reactant to contact and react with a desired amount of the solid-state fuel source to produce hydrogen gas continuously or intermittently on demand, responsive to the needs of a fuel cell.

11 Claims, 5 Drawing Sheets

METHOD OF STORING AND GENERATING HYDROGEN FOR FUEL CELL APPLICATIONS

FIELD OF THE INVENTION

This invention relates to a hydrogen storage and generation method and more particularly to a method of safely storing hydrogen in a hydride form and generating hydrogen on demand to feed hydrogen to a power-generating device such as a fuel cell or a hydrogen combustion engine.

BACKGROUND OF THE INVENTION

A major drawback in the utilization of hydrogen-based fuel cells for powering vehicles or microelectronic devices is the lack of an acceptable lightweight, high-capacity, and safe hydrogen storage medium. Four conventional approaches to hydrogen storage are currently in use: (a) liquid hydrogen, (b) compressed gas, (c) cryo-adsorption, and (d) metal hydride or chemical hydride storage systems. A brief description of these existing approaches is given below:

(a) The liquid hydrogen storage approach offers good solutions in terms of technology maturity and economy, for both mobile storage and large-volume storage systems with volumes ranging from 100 liters to 5000 m$^3$. However, the containers for storing the liquefied hydrogen are made of very expensive super-insulating materials.

(b) The compressed gas storage approach is usually applied in underground supply systems, similar to a network of natural gas pipelines. This is an economical and simple approach, but it is unsafe and not portable. Compressed hydrogen gas in a large steel tank could be an explosion hazard.

(c) The cryo-adsorbing storage approach involves moderate weight and volume. In this approach, hydrogen molecules are bound to the sorbent only by physical adsorption forces, and remain in the gaseous state. The adsorbing temperature is in the range of 60 to 100° K. Activated carbon is commonly used as the sorbent due to its large number of small pores serving as hydrogen storage sites. The efficiency of $H_2$ uptake is no more than 7 wt %, which is equivalent to about 20 kg $H_2$ per cubic meter of activated carbon. The disadvantages of this approach are related to the low capacity and the cryogenic temperature required, which makes it necessary to use expensive super-insulated containers.

(d) The metal hydrides can store $H_2$ via a chemical reaction of $H+M \approx M-H$, wherein M is a selected metal element. Two major metal systems, i.e. Fe—Ti and Mg—Ni, have been applied as hydrogen storage media and have been put into use in automobiles driven by a $H_2/O_2$ fuel cell. The operating temperature is 40-70° C. for the Ti—Fe system and 250-350° C. for the Mg—Ni system. The hydrogen storage capacity is less than 5 wt % for Ni—Mg and 2 wt % for Fe—Ti, which corresponds to less than 70 kg $H_2$ per m$^3$ of metals. Furthermore, metal hydride systems normally require 20-40 bar pressure to keep the hydrogen in equilibrium. This renders the container for the metal hydride too heavy and expensive, and limits the practical exploitation of these systems for portable electronic and mobility applications.

Another class of hydrogen storage materials is based on the storage technologies in which hydrogen is generated through a chemical reaction such as hydrolysis and hydrogenation-dehydrogenation. Common reactions involve chemical hydrides with water or alcohols. Typically, these reactions are not easily reversible on-board a vehicle. Hence, the spent fuel and/or byproducts must be removed from the vehicle and regenerated off-board. Hydrolysis reactions involve the oxidation reaction of chemical hydrides with water to produce hydrogen. This prior art approach is well summarized in the following patent literature:

1. S. Suda, "Method for Generation of Hydrogen Gas," U.S. Pat. No. 6,358,488 (Mar. 19, 2002).
2. S. C. Amendola, et al., "System for Hydrogen Generation," U.S. Pat. No. 6,534,033 (Mar. 18, 2003).
3. S. C. Amendola, et al., "Portable Hydrogen Generator," U.S. Pat. No. 6,932,847 (Aug. 23, 2005).
4. C. A. Lumsden, et al., "Aqueous Borohydride Compositions," U.S. Pat. No. 6,866,689 (Mar. 15, 2005).
5. R. M. Mohring, et al., "System for Hydrogen Generation," U.S. Pat. No. 7,083,657 (Aug. 1, 2006).

As an example, the reaction for sodium borohydride is:

$$NaBH_4 + 2H_2O = NaBO_2 + 4H_2. \quad (1)$$

In real practice, a slurry of an inert stabilizing liquid is used to protect the hydride from contact with moisture. At the moment of actual use, the slurry is mixed with water and the consequent reaction produces high purity hydrogen. In another approach, sodium borohydride is dissolved in water, which is stabilized by a caustic salt such as NaOH or KOH to form a solution. The alkaline state of the solution prevents the dissolved sodium borohydride from decomposing and prematurely releasing hydrogen gas. Hydrogen is generated on demand by bringing this alkaline solution to contact a metal catalyst such as platinum or ruthenium. This prior art approach has the following major drawbacks: (1) the need to use an expensive catalyst such as platinum; (2) a limited solubility of $NaBH_4$ in water at a given temperature and the need to include water in the fuel container, resulting in a reduced amount of $NaBH_4$ that can be accommodated in a container (hence, a low energy density); and (3) the need to use a caustic ingredient that makes the handling of the fuel more difficult (corrosion-resistant container required) and complicates the process for recovering the spent fuel such as $NaBO_2$.

A potentially effective approach to utilizing a chemical hydride such as sodium borohydride as a hydrogen source is to begin with a hydrogen-generating process with a dry, solid chemical hydride separate from a liquid phase such as water or alkaline solution (not allowing sodium borohydride to be dissolved in an aqueous alkaline solution). Upon demand from a hydrogen powered device such as a fuel cell, the complex hydride is brought to contact with water and a metal catalyst. This approach may be represented by the following patents:

6. P. A. Kerrebrock, et al., "Hydrogen Generation by Hydrolysis of Hydrides for Undersea Vehicle Fuel Cell Energy Systems," U.S. Pat. No. 5,372,617 (Dec. 13, 1994).
7. S. W. Jorgensen, "Method of Generating Hydrogen From Borohydrides and Water," U.S. Pat. No. 6,866,836 (Mar. 15, 2005).
8. S. H. Kravitz, et al., "Compact Solid Source of Hydrogen Gas," U.S. Pat. No. 6,746,496 (Jun. 8, 2004).

There are still problems associated with this approach. For instance, adding water to commercially available powders, granules, or pellets of solid sodium borohydride, in the presence of a metal catalyst, such as ruthenium, results in caking and scaling of the borohydride surface due to production of the reactant product sodium metaborate ($NaBO_2$) in the form of a surface layer (i.e., crust or scale). As the scale layer grows progressively thicker, it gets increasingly more difficult for the water to penetrate through the metaborate crust to reach the unreacted NaBH$_4$ fuel below, resulting in a decreased hydrogen production rate. Kravitz, et al., [Ref. 8 cited above] attempted to solve the problem of crust formation (i.e., caking, scaling) of the surface of solid sodium borohydride particles, granules, or pellets from the reaction product sodium metaborate (i.e., borax) during hydrogen production by using micro-disperse particles of solid sodium borohydride. The micro-disperse particles are in the form of microspheres having a diameter of 1-100 microns. The water only has to diffuse through a very thin layer of sodium metaborate to totally react each fuel particle to completion. However, this approach requires the incorporation of nanometer-scaled metal particles as a catalyst in the micro-disperse particles. Nano catalyst particles such as platinum, ruthenium, and cobalt are very expensive. They are also difficult to recover and reuse once they become part of the spent fuel.

The above review indicates that the hydrogen storage technology still has the following major barriers to overcome: (1) low H$_2$ storage capacity, (2) difficulty in storing and releasing H$_2$ (normally requiring a high temperature to release and a high pressure to store), (3) high costs, (4) potential explosion danger, (5) need to utilize expensive catalysts, and (6) utilization of caustic solution. A need exists for a new high-capacity medium that can safely store and release hydrogen at near ambient temperature and pressure conditions. More specifically, what is further needed is a material and system for generating hydrogen gas that utilizes a metal hydride or a chemical hydride, such as solid sodium borohydride, in a highly efficient manner that prevents caking and scaling from reducing the hydrogen production yield and without using an expensive metal catalyst.

It may be noted that Kaufman, et al ["Hydrogen Generation by Hydrolysis of Sodium Tetrahydroborate: Effects of Acids and Transition Metals and their Salts," Journal of Chem. Soc., Dalton Trans. (1985) 307-313] studied the effect of an acid solution or metal salt solution on the hydrolysis of sodium borohydride in a solution form. However, their study did not utilize (nor did they suggest explicitly or implicitly the utilization of) a dry, solid acid powder in an admixture with solid sodium borohydride, which is found by us to be a very convenient form of reactant delivery. By contrast, our invented approach entails delivering a dry, solid acid that is either pre-mixed with solid sodium borohydride (or other chemical hydride or metal hydride) at a desired proportion, or mixed with solid sodium borohydride (or other chemical hydride or metal hydride) at a proportion that varies with time according the changing hydrogen consumption need of a fuel cell. The mixture is delivered, on demand, to contact with a reactant liquid (e.g., water or alcohol). Furthermore, the study of Kaufman, et al. was limited to sodium borohydride, not including any other type of chemical hydride or any simple metal hydride. They also failed to use environmentally benign acids or metal salts to accelerate the hydrogen generation reaction. For instance, they used perchloric acid which is undesirable. This is an important consideration since the hydrogen generation herein discussed is intended for use by billions of people on a daily basis in their automobiles, motorcycles, microelectronic devices, etc. The only liquid reactant used by Kaufman, et al. was water. By contrast, we have also surprisingly observed that metal hydride reactions with an alcohol (methanol, ethanol, etc.) can be accelerated by using a small amount of very inexpensive acid or metal salt.

Hence, an object of the present invention is to provide a method that features a high hydrogen storage capacity and an ability to safely and reliably store and feed hydrogen fuel to a power-generating device such as a combustion engine or fuel cell.

Another object of the present invention is to provide a method that is capable of storing hydrogen in a metal hydride or chemical hydride and releasing the hydrogen fuel in a controlled manner without involving an excessively high heating temperature and without using an expensive metal catalyst.

Still another object of the present invention is to provide a hydrogen storage and supply material that is particularly suitable for feeding hydrogen fuel to fuel cells for use in apparatus such as portable electronic devices, automobiles, specialty vehicles, and unmanned aerial vehicles (UAV) where device weight is a major concern.

SUMMARY OF THE INVENTION

The present invention provides a hydrogen gas storage and supply method wherein hydrogen is stored as part of a metal hydride or chemical hydride and hydrogen is generated when the hydride is brought to contact and react with a liquid reactant such as water or alcohol. An important element in the method is the utilization of a reaction-controlling agent (in the solid state), such as an acid or a metal salt, to accelerate (or delay) the reaction between a hydride and a liquid reactant. This accelerator is essential to providing an adequate hydrogen generation rate for the operation of a fuel cell for a motorcycle, wheelchair, golf cart, automobile, etc. For vehicular applications, a fuel cell could consume hydrogen fuel at a rate of 10 grams to 1 kilogram per hour. Surprisingly, the accelerator makes it possible to produce an adequate amount of hydrogen without using an expensive catalyst such as nano-scaled metal particles (Pt and Ru, etc.). An inexpensive and environmentally benign acid such as citric acid can be used instead.

The method comprises two essential steps: (a) providing a dry, solid-state hydrogen fuel source comprising a solid metal hydride or chemical hydride and a reaction-controlling agent in a solid state, wherein the hydride and the reaction-controlling agent are mixed at a desired proportion; and (b) delivering a desired amount of a liquid reactant to contact and react with a desired amount of the solid-state fuel source to produce hydrogen gas. The presently invented method is applicable to a wide range of metal hydrides (including mixed metal hydrides) and chemical hydrides (complex hydrogen metal compounds). In particular, the chemical hydride may be selected from the group consisting of compositions represented by the general formula $M^I M^{III} H_{4-n} R_n$, compositions represented by $M^{II}(M^{III} H_{4-n} R_n)_2$, and combinations thereof, in which $M^I$ is an alkali metal, $M^{II}$ is an alkaline earth metal or zinc, $M^{III}$ is an element selected from the group consisting of boron, aluminum and gallium, R is an alkoxy group, aryloxy group or acyloxy group and the subscript n is 0, 1, 2 or 3.

Another preferred embodiment of the present invention is a hydrogen gas storage and supply method, comprising: (a) providing a hydrogen fuel source comprising a metal hydride or chemical hydride dissolved and/or dispersed in a liquid medium; and (b) delivering a desired amount of a reaction-controlling agent in a solid state to contact with the hydrogen fuel source to produce hydrogen gas. Preferably, the hydrogen fuel source further comprises a stabilizing agent selected from LiOH, NaOH, KOH, RbOH, CsOH, Be(OH)$_2$, Mg(OH)$_2$, Ca(OH)$_2$, Sr(OH)$_2$, Ba(OH)$_2$, or a combination thereof to extend the shelf life of a metal hydride or chemical hydride that is commercially available in a solution form. The hydrogen production process is initiated or accelerated when a controlled amount of the reaction-controlling agent (preferably in a solid powder form) is delivered to contact the liquid medium containing the hydride. One advantage of this method is the notion that the reaction-controlling agent in a solid form can be conveniently delivered to accelerate the hydrogen generation process without having to use an expensive catalyst such as platinum or ruthenium.

DETAILED DESCRIPTION OF PREFERRED EMBODIMENTS

Figure 1:
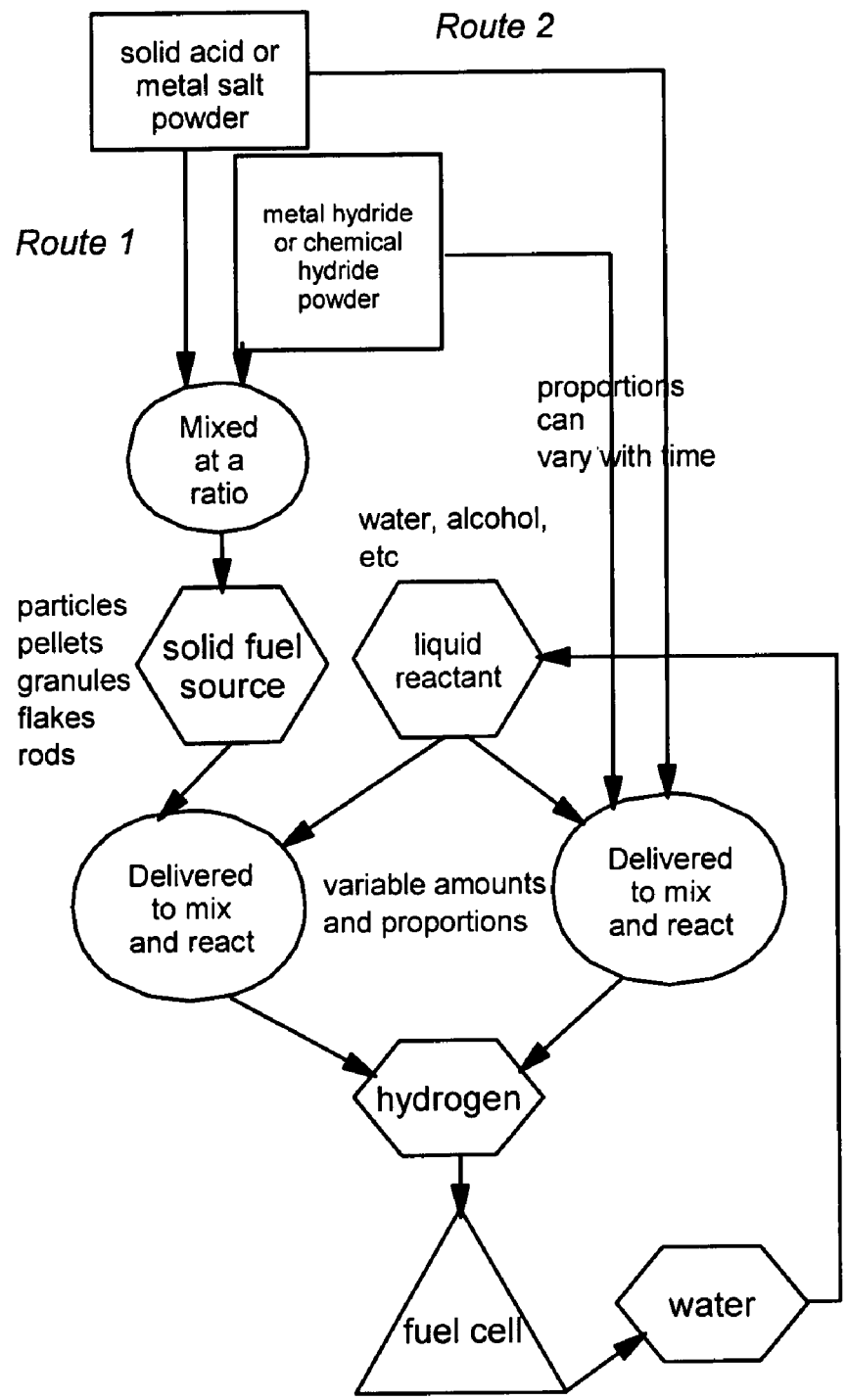
FIG. 1 A flowchart to indicate the essential steps in the invented method.
Figure 2:
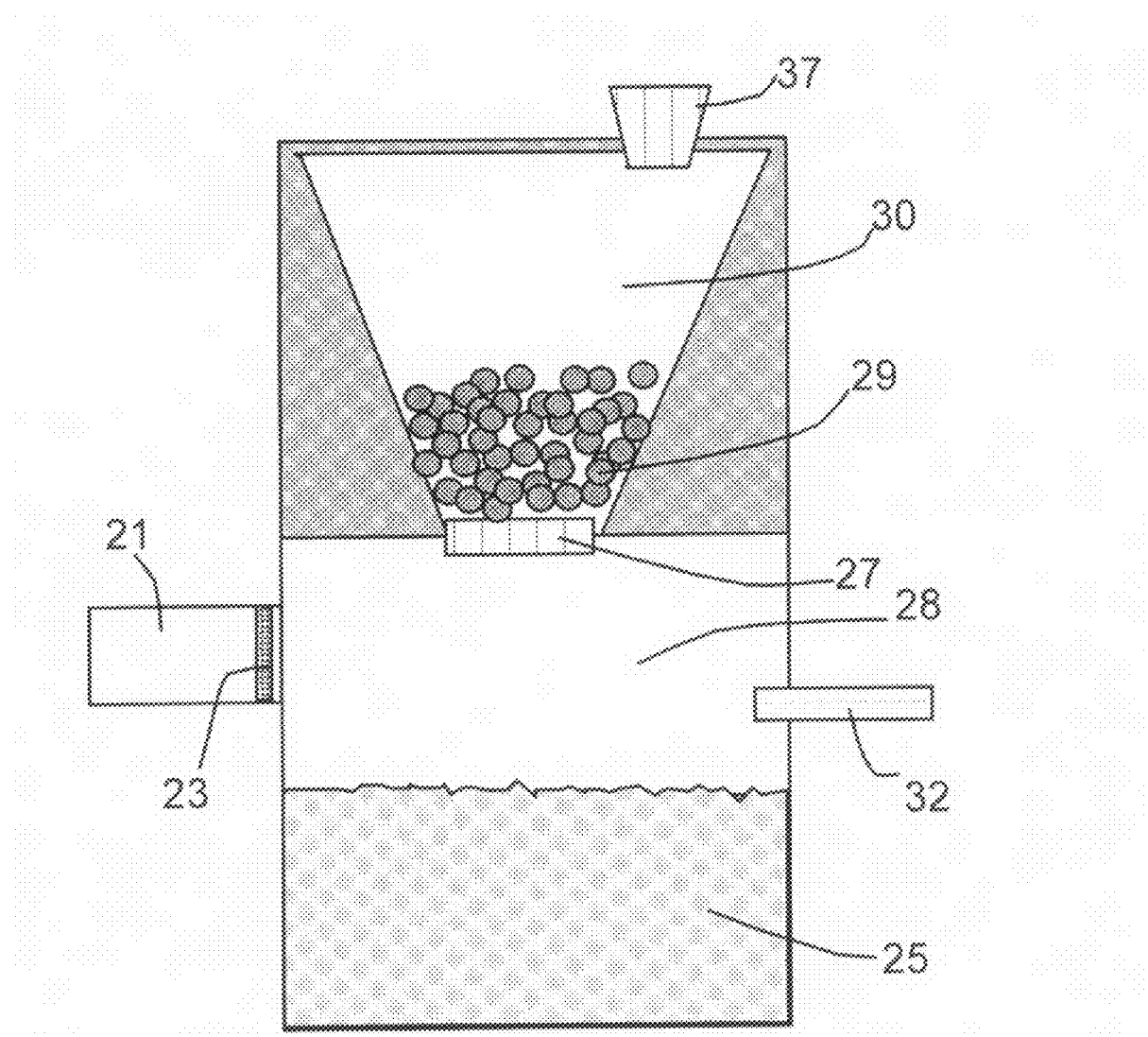
FIG. 2 Schematic of a hydrogen generation system according to a preferred embodiment of the presently invented method (Route 1).

The present invention provides a hydrogen gas storage and supply method wherein hydrogen is stored as part of a metal hydride or chemical hydride and hydrogen is released when the hydride is allowed to contact and react with a liquid reactant such as water or alcohol. Typically, the reaction between a hydride and a liquid reactant is accelerated by a reaction-controlling agent such as an acid or a metal salt in a solid state, without using an expensive catalyst such as nano-scaled metal particles. In some cases, the reaction-controlling agent serves to prevent or slow down an otherwise violent reaction. The procedures are schematically shown in FIG. 1, which indicates two preferred routes to follow:

In one preferred route (Route 1), the hydride and the reaction-controlling agent are pre-mixed at a desired proportion to make multiple particles in a form of beads, pellets, granules, flakes, capsules, or any other solid powder form. As illustrated in FIG. 2, solid hydride powder (e.g., sodium borohydride, $NaBH_4$) and solid acid powder (e.g., citric acid) may be mixed and made into small beads 29 that are fed into a chamber 30 through a valve 37. Each bead may be a mixture of the hydride and the reaction-controlling agent. Alternatively, two types of beads, one of hydride and the other of reaction-controlling agent, may be uniformly mixed as a fine mixture powder. When hydrogen gas is needed, a desired amount of this solid mixture in a powder form (a desired number of beads in this figure) is dispensed through a bead dispenser 27 into a chamber 28 where the beads come in contact with a liquid reactant 25 and react therewith to produce hydrogen. The generated hydrogen gas molecules are directed to permeate through a hydrophobic membrane 23 into a tubing 21 that feeds hydrogen into a fuel cell (not shown). Since the byproduct of a hydrogen-oxygen fuel cell is water, the liquid reactant (water) can be supplied from the fuel cell (e.g., through conduit 32). In this manner, only a minimal amount of water needs to be pre-fed into chamber 28, thus significantly reducing the total weight of a fuel cell-based power supply system. This is particularly important for vehicular power applications where reduced weight is always a highly desirable feature. This liquid reactant may be supplied into the chamber 28 either continuously or intermittently on demand. The liquid may be dispensed drop by drop, with a desirable amount of liquid reactant at a time. Liquid dispensing or injecting devices are well known in the art.

Further preferably, the hydrogen gas pressure in chamber 28 may be used to regulate the amount of a liquid reactant or the amount of the solid-state fuel source that is delivered to participate in the chemical reaction (e.g., hydrolysis or alcoholysis) at a time. A pressure gauge may be used to monitor the gas pressure in chamber 28 and when the hydrogen gas pressure drops to below a threshold level, an additional amount (e.g., two additional beads) may be added to the reaction chamber. This desired threshold pressure is defined by the operational need of a fuel cell that consumes hydrogen fuel.

Figure 3:
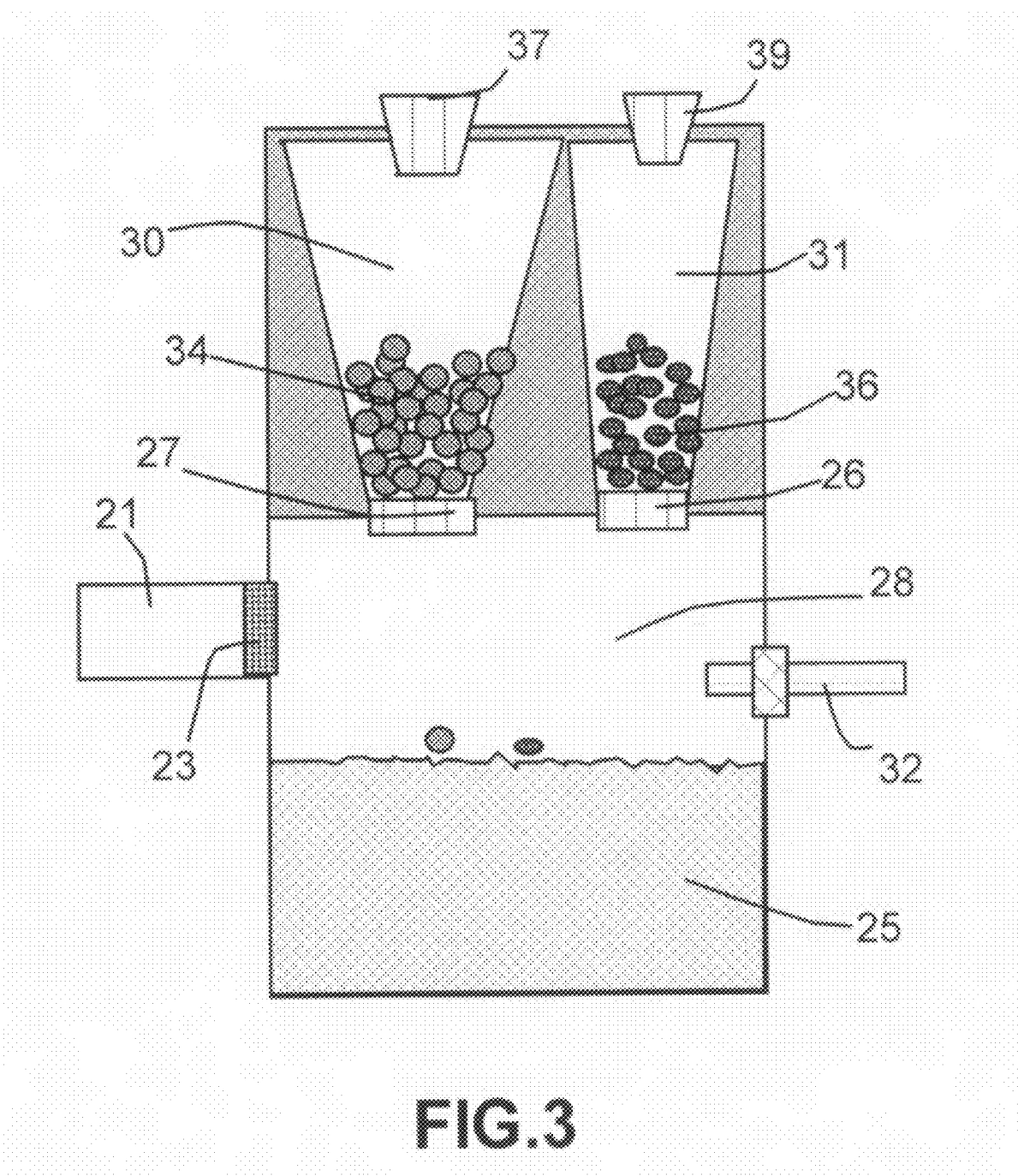
FIG. 3 Schematic of a hydrogen generation system according to another preferred embodiment of the presently invented method (Route 2).

We have observed that, in general, a higher proportion of solid acid or metal salt leads to a faster hydrogen release rate given the same amount of metal hydride or chemical hydrogen. Hence, this proportion may be allowed to vary in response to the changing need of a fuel cell demanding an increasing or decreasing hydrogen supply rate. Route 2 in FIG. 1 enables the amounts of hydride, reaction-controlling agent, and liquid reactant to be independently controlled. An apparatus that enables this function is schematically shown in FIG. 3, wherein solid hydride powder 34 (beads or pellets, etc) is replenished through an opening or valve 37 into a fuel chamber 30. The reaction-controlling agent in solid powder form 36 can be fed through valve 39 into chamber 31. A powder dispensing device 27 may be operated to provide a desired amount of hydride into the reaction chamber 28. On a separate basis, the reaction-controlling agent may be dispensed into chamber 28 via a powder dispensing device 26. The solid hydride amount, the reaction-controlling agent amount, and their proportion may be varied according to the operating conditions of a fuel cell.

Alternatively, a higher hydrogen generation rate can be achieved by simply delivering a greater amount of the fuel source (e.g., solid hydride and solid acid mixture) to react with a greater amount of a liquid reactant (e.g., water or alcohol) at a given time. Both Route 1 and Route 2 permit this option to be carried out.

Hence, the invented method comprises two essential steps: (a) providing a dry, solid-state hydrogen fuel source comprising a solid metal hydride or chemical hydride and a reaction-controlling agent also in the solid state, wherein the hydride and the reaction-controlling agent are mixed at a desired proportion; and (b) delivering a desired amount of a liquid reactant to contact and react with a desired amount of the solid-state fuel source to produce hydrogen gas.

Both simple metal hydrides and complex metal hydrides are useful in the hydrogen generation methods of the present invention. As an example, the complex metal hydrides may have the general chemical formula $MBH_4$, where M is an alkali metal selected from Group I (formerly Group IA) of the periodic table, examples of which include lithium, sodium or potassium. M may, in some cases, also be ammonium or organic groups. B is an element selected from group 13 (formerly Group IIIA) of the periodic table, examples of which include boron, aluminum, and gallium. H is hydrogen. Examples of metal hydrides to be used in accordance with the present invention include, but are not limited to, $NaBH_4$, $LiBH_4$, $KBH_4$, $NH_4BH_4$, $(CH_3)_4NH_4BH_4$, $NaAlH_4$, $LiAlH_4$, $KAlH_4$, $NaGaH_4$, $LiGaH_4$, $KGaH_4$, and mixtures thereof. The following borohydrides are preferred: sodium borohydride ($NaBH_4$), lithium borohydride ($LiBH_4$), potassium borohydride (KBH$_4$), ammonium borohydride (NH$_4$BH$_4$), tetramethyl ammonium borohydride ((CH$_3$)$_4$NH$_4$BH$_4$), quaternary borohydrides, and mixtures thereof.

For the aforementioned chemical hydrides (e.g., borohydrides), hydrogen gas (H$_2$) and borate (BO$_2^-$) are generated by reacting borohydride with water, as illustrated by chemical reaction (2) below:

$$BH_4^- + 2H_2O = BO_2^- + 4H_2 \qquad (2)$$

However, this chemical reaction occurs very slowly unless a metal catalyst or an acid accelerator is used. The resulting borate is non-toxic and environmentally safe. In addition, borate can be regenerated into borohydride. It is important to note that all of the hydrogen atoms present in borohydride and water are converted to hydrogen gas, and that half of the hydrogen atoms in the hydrogen gas produced by reaction (2) actually comes from the water. Since water is a by-product of a fuel cell system, the by-product water can be fed back to the presently invented hydrogen generating system. This is a highly advantageous feature. It is believed that the borohydride is capable of reducing protonic hydrogen in water to produce hydrogen gas while the borohydride is simultaneously oxidized to borate and hydrogen gas.

Particular examples of a second group of metal hydrogen complex compounds, based on divalent metal elements, include, but not limited to, zinc borohydride Zn(BH$_4$)$_2$, magnesium borohydride Mg(BH$_4$)$_2$, calcium borohydride Ca(BH$_4$)$_2$, zinc boron tetramethoxy hydride Zn[B(OCH$_3$)$_2$H$_2$]$_2$, and calcium boron hexaethoxy hydride Ca[B(OC$_2$H$_5$)$_3$H]$_2$. These metal hydrogen complex compounds can be used either singly or as a combination of two kinds or more. Each of these complex compounds is a known compound and available on the market as a selective hydrogenation agent.

Thus, as a preferred embodiment, the method of the present invention for the generation of hydrogen gas, which has been established as a result of the extensive investigations undertaken by the inventors, comprises the steps of: (a) providing a fuel source comprising a reaction-controlling agent and a metal hydride or a chemical hydride (a metal hydrogen complex compound) of a composition represented by the general formula M$^I$M$^{III}$H$_{4-n}$R$_n$ (Formula I) or M$^{II}$(M$^{III}$H$_{4-n}$R$_n$)$_2$ (Formula II) in which M$^I$ is an alkali metal, M$^{II}$ is an alkaline earth metal or zinc, M$^{III}$ is an element selected from the group consisting of boron, aluminum and gallium, R is an alkoxy group, aryloxy group or acyloxy group and the subscript n is 0, 1, 2 or 3; and (b) contacting the fuel source with a liquid reactant to activate the decomposition reaction of the metal hydride or metal hydrogen complex compound to produce hydrogen gas.

As a general trend, the metal hydrogen complex compounds of the general formula (I) or (II), in which the subscript n is not zero, have low reactivity as compared with the compounds of which the subscript n is 0. Accordingly, the R-substituted complex compounds may be useful as a reaction moderator when a moderately decreased rate of hydrogen gas generation is desired.

The hydrogen-generating reactions of these metal hydrogen complex compounds of the general formulas (I) and (II) with water are expressed by the following reaction equations:

$$M^I M^{III} H_{4-n} R_n + 2H_2O = (4-n)H_2 + M^I M^{III} O_2 + nRH \qquad (3)$$

and $$M^{II}(M^{III} H_{4-n} R_n)_2 + 4H_2O = 2(4-n)H_2 + M^{II} M^{III}_2 O_4 + 2nRH \qquad (4)$$

respectively, in which each symbol has the same meaning as defined above.

The above reaction equations indicate that the hydrogen gas generated by the reaction is a combination of the hydrogen atoms partly provided by the decomposition of the metal hydrogen complex compound and partly provided from the water molecules so that a quite high efficiency can be obtained for the hydrogen gas generation. For example, a hydrogen gas yield of as high as 10.9% by weight can be obtained by using sodium borohydride as the metal hydrogen complex compound.

Another hydrogen storage and generation method of the present invention is based on the hydrolysis reaction of a simple metal hydride, such as MgH$_2$, with water to form Mg(OH)$_2$ and H$_2$. In a prior art approach (e.g., U.S. Pat. No. 7,052,671, May 30, 2006 to McClaine, et al), particles of MgH$_2$ were contained in a non-aqueous slurry (e.g., mineral oil) to inhibit premature water reactions when hydrogen generation was not required. Material-based capacities for the MgH$_2$ slurry reaction with water can be as high as 11 wt. %. It may be noted that in this prior art approach, typically 25% to 60% of mineral oil is used as a carrier fluid in order to make the resulting slurry pumpable (for delivering the slurry into a reaction chamber). Such a large amount of mineral oil reduces the gravimetric efficiency of the hydrogen storage system. By contrast, our solid powder based system requires the use of a reaction-controlling agent at a proportion of 0.1%-10% (typically less than 5%) based on the total weight of the hydride and the reaction-controlling agent combined. This is a very significant advantage.

In another prior art approach (J. H. Checketts, U.S. Pat. No. 5,728,464 (Mar. 17, 1998) and No. 5,817,157 (Oct. 6, 1998)), sodium or sodium hydride is enclosed in ping pong-sized polyethylene balls, which are immersed in water. When hydrogen is needed, a cutting device is operated to break the ball shell, allowing sodium or sodium hydride to react with water. However, with such a large ball size, sodium and water will likely have a violent reaction. The cutting device makes the hydrogen supply system very bulky.

The chemical approaches may also be based on the concept of reacting a lightweight metal hydride such as LiH, NaH, and MgH$_2$ with methanol and ethanol, a process commonly referred to as alcoholysis. The alcoholysis reaction may be expressed as:

$$MH_x + ROH = xH_2 + M(OR)_2 \qquad (5)$$

Alcoholysis reactions may lead to controlled and convenient hydrogen production at room temperature and below. Hence, in the present invention, the liquid reactant may comprise water, methanol, ethanol, propanol, or a mixture thereof.

Figure 4:
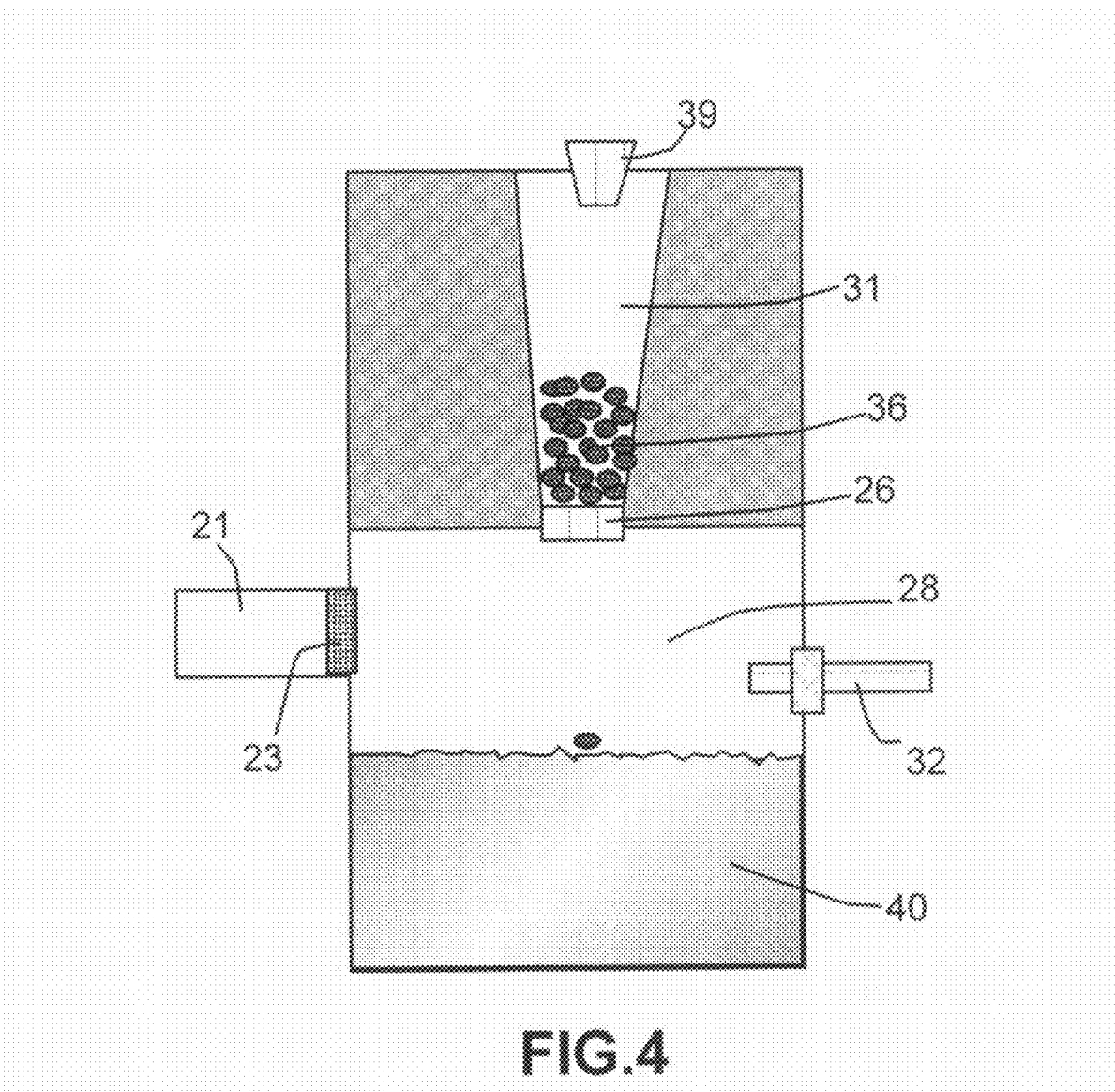
FIG. 4 Schematic of a hydrogen generation system according to another preferred embodiment of the presently invented method that entails delivering a controlled amount of reaction-controlling agent to a stabilized solution.

Chemical hydrides are commercially available in a solid form or in the form of aqueous hydride solution containing a stabilizing agent such as NaOH to prevent the hydride from prematurely decomposing. In the latter situation, the use of an inexpensive, environmentally benign acid (e.g., solid citric acid) can initiate and/or accelerate the hydrogen production rate from the solution. As illustrated in FIG. 4, a reaction-controlling agent 36 in a solid state is contained in a chamber 31 with a feeding valve 39. When additional hydrogen is needed, a valve or powder-dispensing device 26 is operated to deliver a controlled amount of the reaction-controlling agent 36 into a reaction chamber 28 wherein the reaction-controlling agent comes in contact with the stabilized fuel solution and reacts therewith to produce hydrogen. This controlled amount is responsive to the demand from a fuel cell. Additional amount of the stabilized solution may be replenished through the valve and tubing 32. Hence, another preferred embodiment of the present invention is a hydrogen gas storage and supply method, comprising: (a) providing a hydrogen fuel source (e.g., 40 in FIG. 4) comprising a metal hydride or chemical hydride dissolved and/or dispersed in a liquid medium; and (b) delivering a desired amount of a reaction-controlling agent 36 in a solid state to contact with the hydrogen fuel source to produce hydrogen gas. Preferably, the hydrogen fuel source further comprises a stabilizing agent selected from LiOH, NaOH, KOH, RbOH, CsOH, Be(OH)$_2$, Mg(OH)$_2$, Ca(OH)$_2$, Sr(OH)$_2$, Ba(OH)$_2$, or a combination thereof to extend the shelf life of a metal hydride or chemical hydride that is commercially available in a solution form. The hydrogen production process is initiated or accelerated when a controlled amount of the reaction-controlling agent (in a solid powder form) is delivered to contact the liquid medium containing the hydride. Solid powder delivery methods are well known in the art.

The reaction-controlling agent preferably comprises an environmentally benign acid selected from the group consisting of salicylic acid, amino acid, glutamic acid, adipic acid, succinic acid, chlorobenzoic acid, tartaric acid, malic acid, ascorbic acid, polyaspartic acid, α-zirconium phosphate, sulphated zirconia, tungsten oxide supported on zirconia, heteropolyacids, and combination thereof. Citric acid is particularly preferred. The reaction-controlling agent preferably comprises an acid or a metal salt in a fine powder form (e.g., particles 52 in FIG. 5(A)). In one preferred embodiment, the reaction-controlling agent 64 and the hydride 62 are mixed at a predetermined ratio in an elongate rod form (e.g., FIG. 5(D)). If the hydride (e.g., magnesium hydride and calcium hydride) is sensitive to moisture, the rod is preferably protected with a coating layer 66, which can be the same material as the reaction-controlling material.

Figure 5:
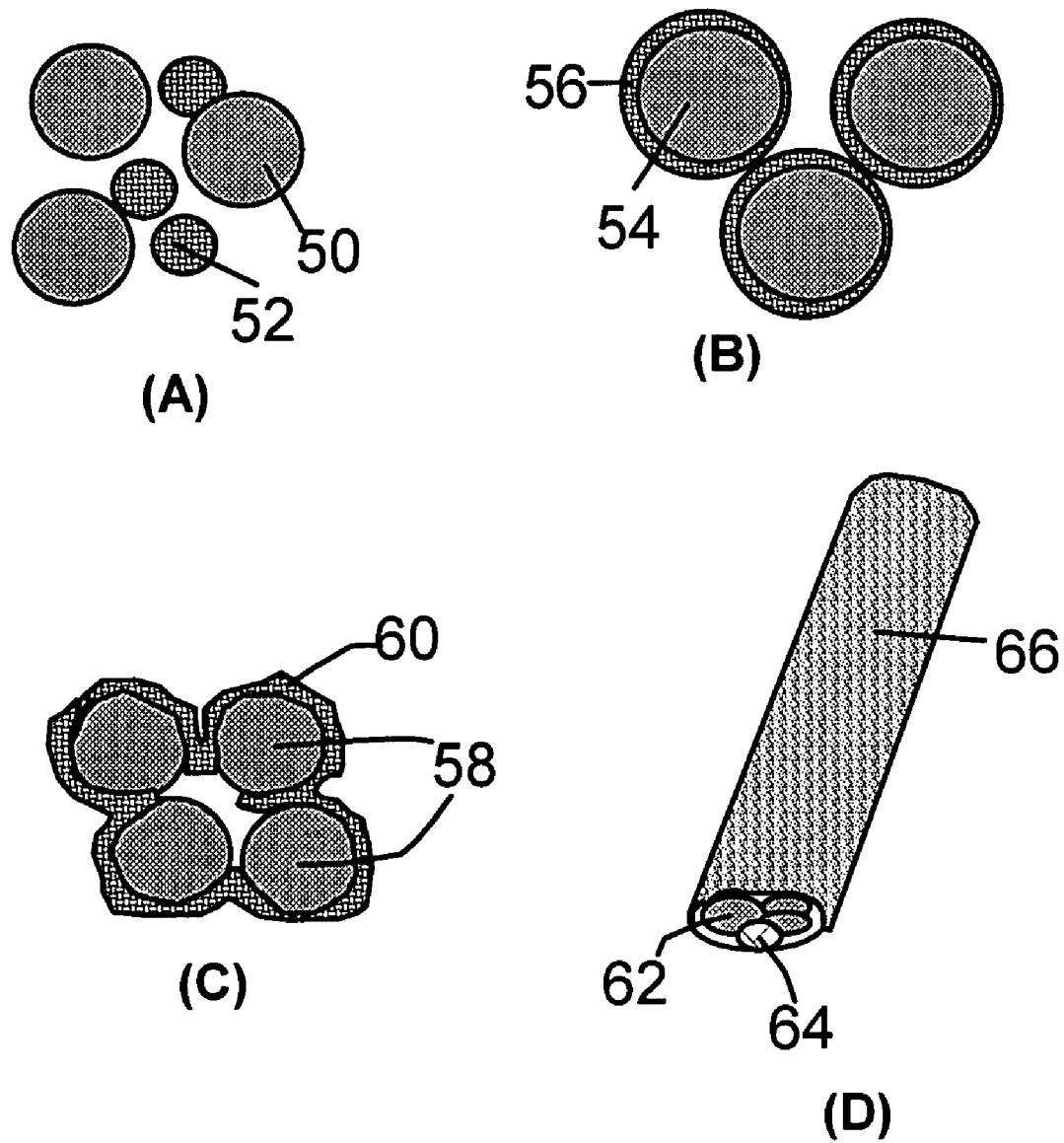
FIG. 5 (A) a mixture of hydride particles 50 and reaction-controlling agent particles 52; (B) hydride particles 54 coated with a reaction-controlling agent 56; (C) a cluster of multiple hydride particles 58 coated with a reaction-controlling agent 60; and (D) hydride particles 62 and reaction-controlling agent particles 64 are formed into an elongate rod, preferably enclosed with a protective coating 66.

In another preferred embodiment, particularly for the cases of moisture-sensitive hydride materials, the hydride comprises individual fine particles (e.g., 54 in FIG. 5(B)) and the reaction-controlling agent 56 is coated on a surface of the hydride particles. Preferably, the hydride particles are fully encapsulated by a solid acid coating material. Alternatively, the hydride comprises clusters of multiple particles 58 (FIG. 5(C)) and the reaction-controlling agent 60 is coated on a surface of the clusters. In these cases, the hydride comprises fine particles of magnesium hydride, calcium hydride, lithium hydride, sodium hydride, potassium hydride, NaBH$_4$, LiBH$_4$, KBH$_4$, NaAlH$_4$, LiAlH$_4$, KAlH$_4$, or a combination thereof. It may be noted that certain hydrides (e.g., magnesium hydride and calcium hydride), when in contact with liquid water, can undergo violent chemical reactions. The reaction-controlling material can be selected to serve as a protective coating against any accidental contact with water.

One practical way of preparing acid-coated hydride particles is to mix hydride particles with solid acid powder and then heat the resulting admixture up above the melting point of the acid. The acid melt will flow around the hydride particles to coat, embed or encapsulate individual particles or clusters of hydride particles. The mixture with the acid component in a liquid (melt) state can be shaped into rods (e.g., via extrusion), clusters of particles (e.g., extrusion+pelletizing), and coated or encapsulated particles (e.g., atomization or aerosol spraying). The melting points for useful acids are given below: citric acid (153° C.), salicylic acid (158° C.), amino acid (100-300° C.), glutamic acid (205° C.), adipic acid (153° C.), succinic acid (185° C.), chlorobenzoic acid (142° C.), tartaric acid (168° C.), malic acid (128-133° C.), ascorbic acid (190° C.), polyaspartic acid (168-190° C.), and phosphoric acid (42° C.).

In the present hydrogen gas storage and supply method, the liquid reactant comprises water, methanol, ethanol, propanol, or a mixture thereof. The step of delivering the liquid reactant or reaction-controlling agent is conducted continuously or intermittently on demand, or at a desired reaction-controlling agent amount to produce hydrogen gas responsive to a need of a hydrogen-consuming power device (e.g., a fuel cell). Most preferably, the liquid reactant comprises water generated by a fuel cell. If so desired, the method may further comprise contacting the liquid reactant or the hydrogen fuel source with catalytic metal nano particles.

It is of significance to note that, in order for the fuel cell system to become acceptable by the automotive industry and widely implemented as a vehicle power source to realize the so-called "hydrogen economy," the on-board hydrogen supply system must be able to generate enough hydrogen to power a fuel cell car for two hours or 100 miles (round trip between home and work). This would require approximately 2-4 kilograms (kg) of hydrogen produced in two hours. In theory, even with a relatively low hydrogen generation rate, we should be able to produce 2 kg of hydrogen in two hours if an excess amount of hydride (e.g., 200 kg of NaBH$_4$ instead of 20 kg) is stored in a car. However, it is desirable to store a minimum amount of fuel in a car to reduce the vehicle weight and to increase the payload that a car can carry. In the case of NaBH$_4$, a complete consumption of 9.45 kg of NaBH$_4$ (plus a stoichiometric amount of water that can come from a fuel cell as a fuel cell reaction by-product) produces 2 kg of hydrogen. Ideally and most desirably, this amount of hydrogen can be produced in two hours to enable continuous driving when needed. This implies that an ability to generate hydrogen at a controlled and adequate rate is essential to the success of fuel cell applications in automotive industry. Since no high pressure is involved, no heavy pressure cylinder is required to accommodate the hydrogen or hydrogen-carrying medium. With an overhead weight of less than 5 kg and the amount of reaction-controlling agent (citric acid) less than 5%, the total system weight is less than 15 kg to provide 2 kg of hydrogen.

The aforementioned practical considerations suggest that it is desirable to carry onboard hydride in the amount of 10-25 kg capable of generating 2 kg of hydrogen gas in two hours for a good round trip between a home and a work place. This amount is light enough that an average adult can hand-carry it in and out of a car. With this in mind, we evaluated the hydrogen production rate of a wide range of material combinations. The results are summarized in Table 1, where the hydrogen production rates were obtained on the basis of 10 kilograms of hydride. The results indicate that, with a suitable amount of a reaction-controlling agent delivered in a solid state, most of the hydrides are able to generate at least 2 kg of hydrogen with 25 kg of hydride. This is not necessarily the case when no acid or metal salt was used as a reaction-controlling agent.

TABLE 1

Hydrogen generation rates of select compositions of (hydride + solid reaction-controlling agent + liquid reactant).

| Sample No. | Hydride | Reaction-controlling agent (RCA) | Hydride + RCA | Liquid Reactant | Hydrogen Prod. rate (kg/hour) per 10 kg hydride |
|---|---|---|---|---|---|
| 1 | $NaBH_4$ | none | | water | <<0.1 |
| 2 | $NaBH_4$ | citric acid | separate powder particles | water | 0.45-1.9 |
| 3 | $NaBH_4$ | $CoCl_2$ | separate powder particles | water | 0.2-0.5 |
| 4 | $NaBH_4$ | $NiCl_2$ | separate powder particles | water | 0.3-1.2 |
| 5 | $LiAlH_4$ | none | | water | 0.1-1.2 |
| 6 | $LiAlH_4$ | citric acid | premixed powder particles | water | 0.5-3.6 |
| 7 | $NH4BH_4$ | none | | water | <<0.1 |
| 8 | $NH4BH_4$ | adipic acid | rods of hydride and RCA | water | 0.2-1.5 |
| 9 | $Mg(BH_4)_2$ | none | | water | <<0.1 |
| 10 | $Mg(BH_4)_2$ | salicylic acid | rods of hydride and RCA | water | 0.23-1.1 |
| 11 | $MgH_2$ | none | | water | 0.2-0.5 |
| 12 | $MgH_2$ | $NiCl2$ | rods of hydride and RCA | water | 0.5-1.4 |
| 13 | $MgH_2$ | none | | methanol | 0.2-0.5 |
| 14 | $MgH_2$ | citric acid | RCA-coated MgH2 powder | methanol | 0.5-1.4 |
| 15 | $CaH_2$ | none | | ethanol | 0.15-0.5 |
| 16 | $CaH_2$ | citric acid | RCA-coated CaH2 powder | ethanol | 0.3-0.92 |
| 17 | NaH | none | | water | 0.2-0.8 |
| 18 | NaH | glutamic acid | RCA-coated NaH powder | water | 0.6-0.8 |
| 19 | LiH | none | | water | 0.8-2.2 |
| 20 | LiH | glutamic acid | RCA-coated LiH powder | water | 1.6-2.2 |

In the case of a stabilized $NaBH_4$ solution (e.g., 12% $NaBH_4$ in water stabilized with 40% NaOH), the solution itself is very stable at room temperature and does not undergo a hydrogen liberation reaction unless a catalyst like platinum is brought in contact with the solution. However, by dispensing a small amount of citric acid into the solution, one immediately observed the formation of hydrogen bubbles. As the amount of acid was increased the bubbles form much quicker. We have observed that a small amount of citric acid (2-5% by weight) in contact with the solution led to a hydrogen generation rate comparable to that of the Pt-catalyzed solution.

In summary, the presently invented technology has the following outstanding advantages:

(1) There is no need to use an expensive catalyst such as platinum;

(2) By separating the hydride such as $NaBH_4$ from a liquid reactant, the approach is not constrained by the limited solubility of $NaBH_4$ in the liquid reactant (water) at a given temperature;

(3) There is no need to include much water in the fuel container. Water can be supplied from the fuel cell stack as a fuel cell reaction byproduct. This can significantly reduce the weight of a hydrogen storage system and increase the gravimetric energy density;

(4) There is no need to use any caustic ingredient that otherwise could make the handling of the fuel more difficult. Only environmentally benign acids or metal salts are involved in practicing the present invention;

(5) It is convenient to handle both the hydride and the reaction-controlling agent in a fine powder form. The two components can be combined to form a mixture powder or coated powder particles at a desired proportion prior to delivery of these two components. Alternatively, the two components can be delivered separately with their proportions varying with time responsive to the changing hydrogen demands of a fuel cell. No caking or scale formation problem is encountered on the surface of the hydride particle once contacting with the liquid reactant.

(6) By coating or encapsulating hydride particles with a thin layer of a reaction-controlling agent, one obtains well-protected hydride particles that will not be subject to an accidental, violent reaction with the liquid reactant (water). In a prior art approach, typically 25% to 60% of mineral oil is used as a carrier fluid in order to make the resulting slurry pumpable (for delivering the slurry into a reaction chamber). Such a large amount of mineral oil reduces the gravimetric efficiency of the hydrogen storage system. By contrast, our solid powder based system requires the use of a reaction-controlling agent at a proportion of 0.1%-10% (typically less than 5%).

The invention claimed is:

1. A hydrogen gas storage and supply method, comprising:
   (a) providing a hydrogen fuel source comprising a metal hydride or chemical hydride dissolved and/or dispersed in a liquid medium; and
   (b) delivering an amount of a reaction-controlling agent in a solid state to contact with said hydrogen fuel source and said liquid medium, without using a metal catalyst, to produce hydrogen gas, wherein said reaction-controlling agent comprises an acid or a metal salt.

2. The hydrogen gas storage and supply method as defined in claim 1, wherein said hydrogen fuel source further comprises a stabilizing agent selected from the group consisting of LiOH, NaOH, KOH, RbOH, CsOH, $Be(OH)_2$, $Mg(OH)_2$, $Ca(OH)_2$, $Sr(OH)_2$, $Ba(OH)_2$, and combinations thereof.

3. The hydrogen gas storage and supply method as defined in claim 1 wherein said chemical hydride is selected from the group consisting of compositions represented by the general formula $M^I M^{III} H_{4-n} R_n$, compositions represented by $M^{II}(M^{III}H_{4-n}R_n)_2$, and combinations thereof, in which $M^I$ is an alkali metal, $M^{II}$ is an alkaline earth metal or zinc, $M^{III}$ is an element selected from the group consisting of boron, aluminum and gallium, R is an alkoxy group, aryloxy group or acyloxy group and the subscript n is 0, 1, 2 or 3.

4. The hydrogen gas storage and supply method as defined in claim 1 wherein said chemical hydride is selected from the group consisting of $NaBH_4$, $LiBH_4$, $KBH_4$, $NH_4BH_4$, $(CH_3)_4NH_4BH_4$, $NaAlH_4$, $LiAlH_4$, $KAlH_4$, $NaGaH_4$, $LiGaH_4$, $KGaH_4$, and mixtures thereof.

5. The hydrogen gas storage and supply method as defined in claim 2 wherein said chemical hydride is selected from the group consisting of $NaBH_4$, $LiBH_4$, $KBH_4$, $NH_4BH_4$, $(CH_3)_4NH_4BH_4$, $NaAlH_4$, $LiAlH_4$, $KAlH_4$, $NaGaH_4$, $LiGaH_4$, $KGaH_4$, and mixtures thereof.

6. The hydrogen gas storage and supply method as defined in claim 1, wherein said metal hydride is based on a metal element or multiple metal elements selected from the group consisting of Li, Na, K, Mg, Ni, Fe, Al, and combinations thereof.

7. The hydrogen gas storage and supply method as defined in claim 1, wherein said reaction-controlling agent comprises an environmentally benign acid selected from the group consisting of salicylic acid, amino acid, glutamic acid, adipic acid, succinic acid, chlorobenzoic acid, tartaric acid, malic acid, ascorbic acid, polyaspartic acid, α-zirconium phosphate, sulphated zirconia, tungsten oxide supported on zirconia, heteropolyacids, and combinations thereof.

8. The hydrogen gas storage and supply method as defined in claim 2, wherein said reaction-controlling agent comprises citric acid.

9. The hydrogen gas storage and supply method as defined in claim 1, wherein said reaction-controlling agent comprises an acid or a metal salt in a fine powder form.

10. The hydrogen gas storage and supply method as defined in claim 1, wherein said reaction-controlling agent and said hydride are mixed at a predetermined ratio in an elongate rod form.

11. The hydrogen gas storage and supply method as defined in claim 1, wherein said step of delivering is conducted continuously or intermittently on demand, or at a desired reaction-controlling agent amount to produce hydrogen gas responsive to a need of a hydrogen-consuming power device.

* * * * *